United States Patent [19]

Narahara et al.

[11] Patent Number: 5,128,919
[45] Date of Patent: Jul. 7, 1992

[54] APPARATUS FOR REPRODUCING AN OPTICALLY RECORDED INFORMATION

[75] Inventors: Tatsuya Narahara; Masahiko Chaya, both of Kanagawa, Japan

[73] Assignee: Sony Corporation, Japan

[21] Appl. No.: 270,518

[22] Filed: Nov. 14, 1988

[30] Foreign Application Priority Data

Nov. 16, 1987 [JP] Japan ............... 62-288948

[51] Int. Cl.$^5$ ............... G11B 3/74; G11B 7/09
[52] U.S. Cl. ............... 369/97; 369/44.12; 369/44.37; 369/121; 369/124
[58] Field of Search ............. 369/44.37, 92, 97, 44.12, 369/116, 121, 122, 124, 102; 360/20

[56] References Cited

U.S. PATENT DOCUMENTS

| | | | |
|---|---|---|---|
| 3,885,110 | 5/1975 | DiMatteo | 369/112 |
| 4,301,527 | 11/1981 | Tsunoda et al. | 369/122 |
| 4,460,988 | 7/1984 | Gordon | 369/32 |
| 4,520,471 | 5/1985 | Carlin | 369/122 |
| 4,644,160 | 2/1987 | Arimoto et al. | 369/44.37 |
| 4,663,738 | 5/1987 | Sprague et al. | 365/234 |
| 4,689,781 | 8/1987 | Ando | 369/122 |
| 4,724,494 | 2/1988 | Koide | 360/20 |
| 4,788,560 | 11/1988 | Miura | 369/116 |
| 4,813,031 | 3/1989 | Bierhoff | 369/50 |
| 4,884,260 | 11/1989 | Bouldin et al. | 369/122 |

FOREIGN PATENT DOCUMENTS 0061045  5/1981  Japan ............... 369/44.37

Primary Examiner—Stuart S. Levy
Assistant Examiner—Tan Nguyen
Attorney, Agent, or Firm—Ronald P. Kananen

[57] ABSTRACT

An apparatus for reproducing an optically recorded information on an optical record medium is disclosed in which a plurality of light sources which irradiate light beams on a plurality of record tracks are illuminated in a time sharing mode and a reproduced signal derived by a receipt of reproduced lights with a signal photo detecting element is processed so as to reproduce the information on the tracks, whereby a crosstalk due to the light sources which simultaneously irradiate the light beams on the plurality of mutually adjacent record tracks can be avoided and a simple construction of the optically recorded information reproducing apparatus can be achieved.

13 Claims, 5 Drawing Sheets

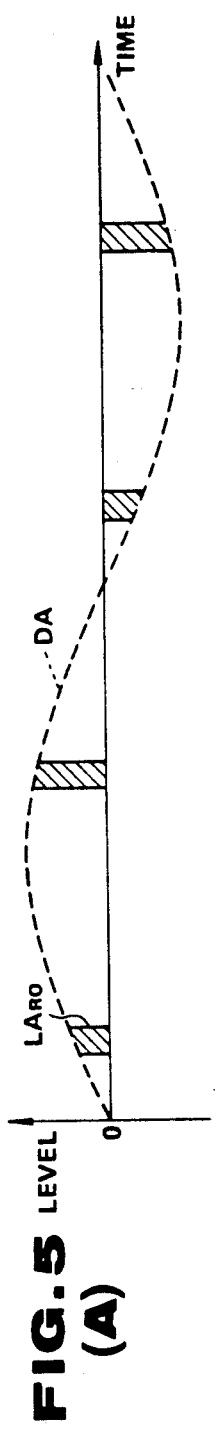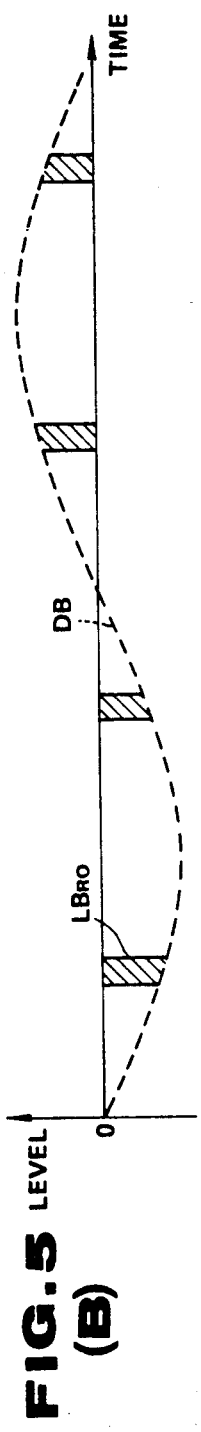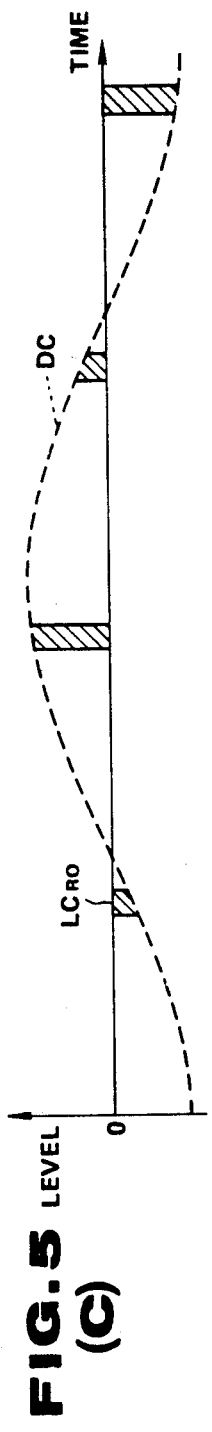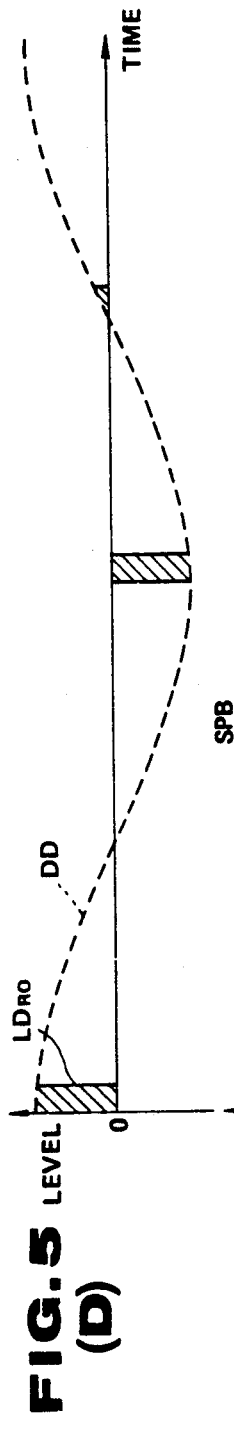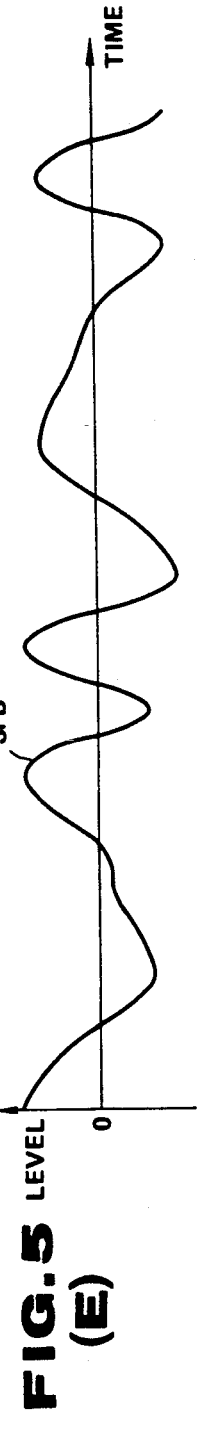

APPARATUS FOR REPRODUCING AN OPTICALLY RECORDED INFORMATION

BACKGROUND OF THE INVENTION

(1) Field of the Invention

The present invention relates to an apparatus for reproducing an optically recorded information. The present invention specifically relates to the apparatus which is suitably applicable to the optically recorded information reproducing apparatus which reproduces simulataneously a plurality of record tracks on an optical record medium.

(2) Background of the Art

In a previously proposed optically recorded information reproducing apparatus (FIG. 7), a light spot for writing and/or reading information on a tape constituting an optical record medium is scanned over the tape optical record medium in a scanning direction transverse to a running direction so that an optical information is written or read on predetermined record tracks. It is noted that a diameter of the light spot can be converged to, e.g., one micrometer (1 μm) (if, e.g., a laser light having a wavelength of 780 nm is used). Hence, if a multiple number of record tracks are formed with, e.g., guard bands sandwiched between adjacent tracks and the optically recorded information can be reproduced from each record track, the optical information can be recorded and reproduced with higher recording density.

Especially if a plurality of, e.g., four light spots can be scanned in the scanning direction so as to hold the four spots at predetermined intervals when the optical information is recorded or reproduced on the record tracks of the optical record medium, the optical information processing speed during the record or reproduction of the optical information on the record medium can be increased, as shown for example in FIG. 8.

An optical record information reproducing apparatus includes a plurality of, e.g., laser light sources having four laser diodes from which laser lights are collected to form light spots so as to enable scanning in the scanning direction of record tracks on the optical record medium. Thus, reproduced lights constituted by reflecting lights according to recorded data on the record tracks are impinged on a plurality of photo detector elements, respectively, to produce reproduced signals.

In details, the laser light source is provided with four laser diodes arranged in a row in the horizontal direction with respect to the record medium, the laser light derived from each laser diode being converted in a parallel light via a corresponding collimator lens (5A-D) and impinged on a deflector element.

The deflector element 6 includes for example an acoustic optical deflector element (AOD) utilizing an anisotropic Bragg diffraction. A lattice vibration pattern is formed which travels in a direction toward an absorbing member, i.e., the scanning direction on an internal part of the acoustic optical deflector element in response to an electrical vibration signal supplied to a transducer.

The incident laser lights are deflected respectively in the scanning direction by means of the deflector element and the reproduced light beams passed through a polarization beam splitter 8, ¼ wave plate 8 (retardation sheet), and object lens 9 and are collected on the record tracks.

On the other hand, reproduced lights constituted by lights providing changes according to optically recorded information of the optical record medium reflected from the respective reproduced light beams are returned to the polarization beam splitter via the object lens and ¼ wave plate and reflected by the splitter to irradiate the reflected light beams on a reproducing photo detector.

The reproducing photo detector includes a plurality of photo detector elements for example constituted by photo diodes and transmits the reproduced signals corresponding to light quantities of imaging spots of the reflected lights.

The four light detector elements are arranged in parallel rows so as to enable the receipt of the individual four reflected lights from the polarization beam splitter along mutually parallel optical axes.

Reproduced signals derived from the respective photo detector elements are converted into digital signals by means of analog-to-digital converters via reproducing signal amplifiers. Then, reproduced data are derived corresponding to the respective record tracks through digital demodulators.

However, since in the above-described optically recorded information reproducing apparatus the photo detector elements of the reproducing photo detector are arranged so that the number of the elements correspond to those of the reproduced light beams incident on the optical record meduim, that is to say, those of the laser light sources, the reproducing processing circuits whose number corresponds to that of the photo detector elements need to be installed. Consequently, the apparatus becomes large sized. In addition, crosstalks may occur between each reproduced light beam incident on the corresponding photo detector element.

Although there are several methods for preventing the crosstalks, for example, the overall form of the photo detector elements is designed or a correction optical system is inserted in the apparatus described above, these methods cannot solve the problem of the large-size of the optically recorded information reproducing apparatus. It is yet insufficient for the solution of the problem.

SUMMARY OF THE INVENTION

It is therefore an object of the present invention to provide an apparatus for reproducing optically recorded information which prevents the occurrence of crosstalks and which can simultaneously reproduce the plurality of record tracks with a simple construction.

The above-described object can be achieved by an apparatus for reproducing an optically recorded information on an optical record medium, comprising: (a) first means, including a plurality of light sources, for operatively irradiating a plurality of record tracks on the record medium so as to form reproduced light beams; (b) second means for receiving the reproduced light beams from the respective record tracks and transmitting reproduced signals upon the receipt of the light beams; (c) third means for controlling the light sources so as to irradiate the light beams in a time sharing mode; and (d) fourth means for processing the reproduced signals derived from the third means in the time sharing mode.

BRIEF DESCRIPTION OF THE DRAWINGS

FIGS. 5 (A) to 5 (E) are waveform charts of relationships between a reproduced signal and record data.

DETAILED DESCRIPTION OF THE PREFERRED EMBODIMENT

Reference will hereinafter be made to the drawings in order to facilitate understanding of the present invention.

Figure 1:
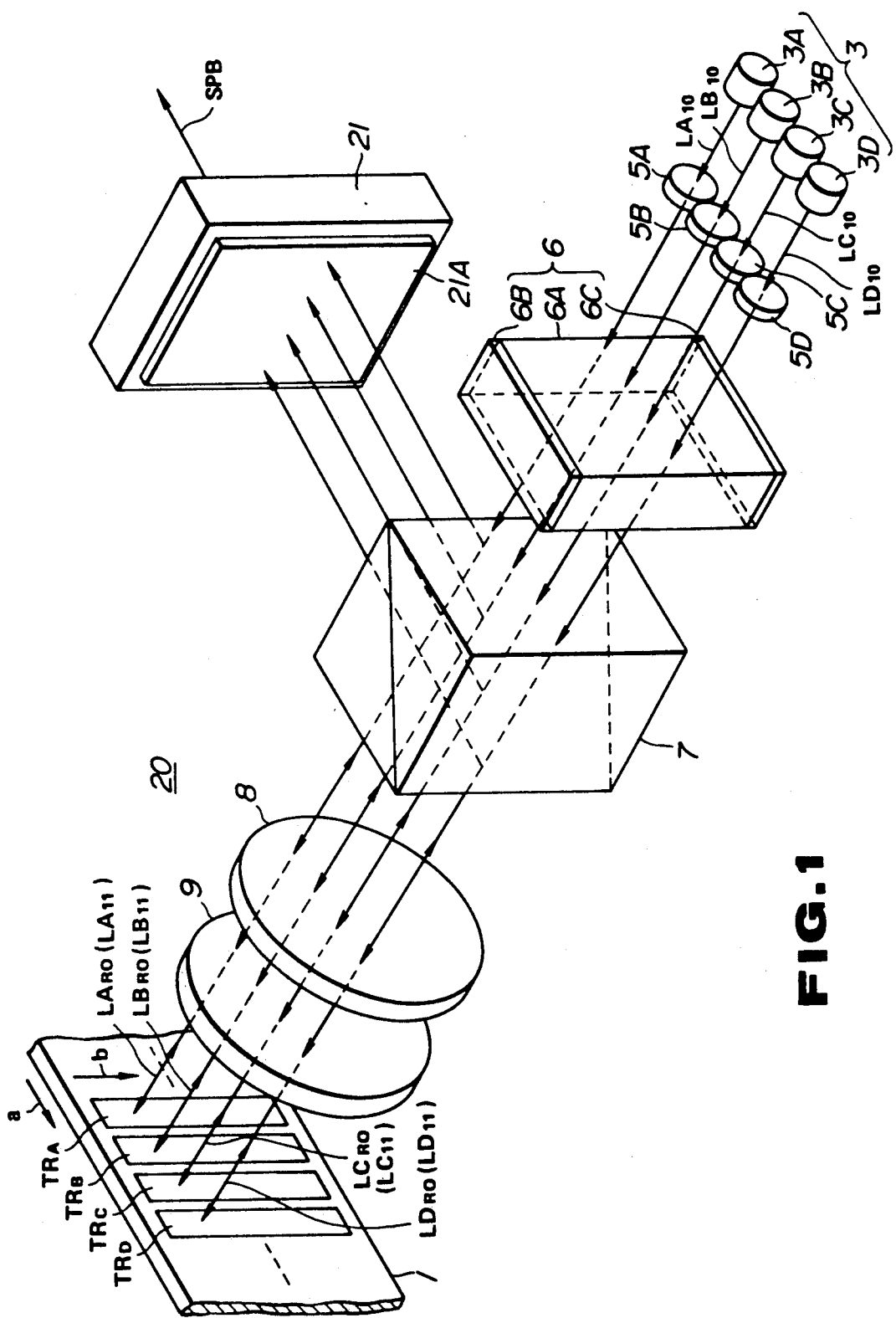
FIG. 1 is a diagramatical perspective view of an apparatus for reproducing optically recorded information in a preferred embodiment according to the present invention.

FIG. 1 shows a preferred embodiment of an apparatus for reproducing optically recorded information.

In FIG. 1, the optically recorded information reproducing apparatus is generally denoted by 20. Laser light sources generally denoted by 3 includes four laser diodes 3A to 3D which emit laser lights in a time sharing mode in place of a simultaneous emission of lights.

Figure 2:
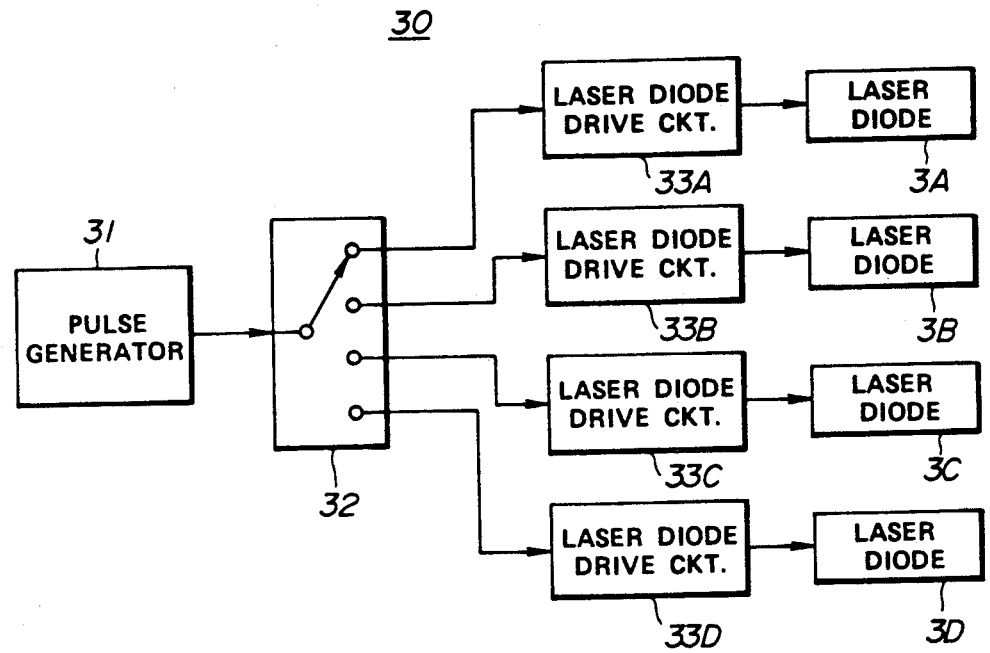
FIG. 2 is a circuit block diagram of a laser diode controlling section of the optically recorded information reproducing apparatus shown in FIG. 1.

FIG. 2 shows a laser diode controlling section 30. The laser diode controlling section 30 controls the driving of the respective laser diodes 3A to 3D.

Figure 3:
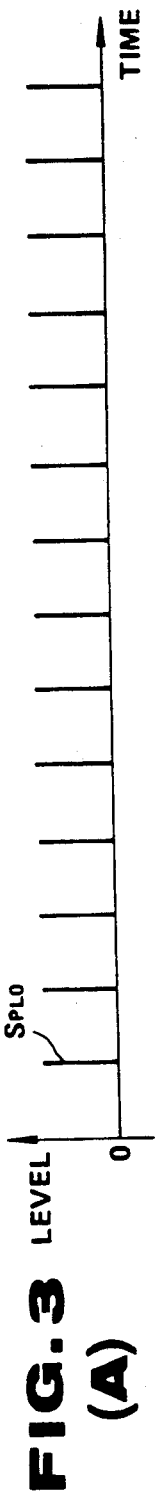
FIGS. 3 (A) to 3 (E) are waveform charts of relationships between a basic pulse signal and each drive pulse signal.
Figure 3:
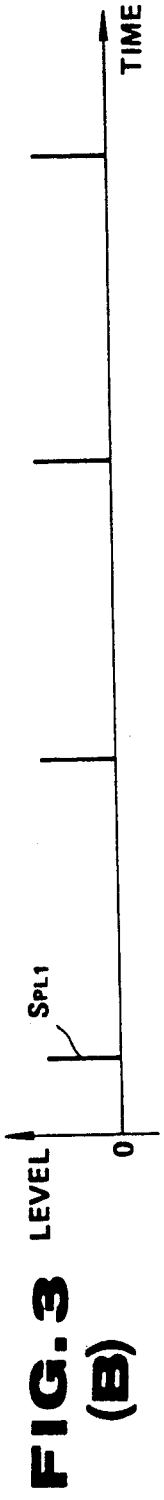
Figure 3:
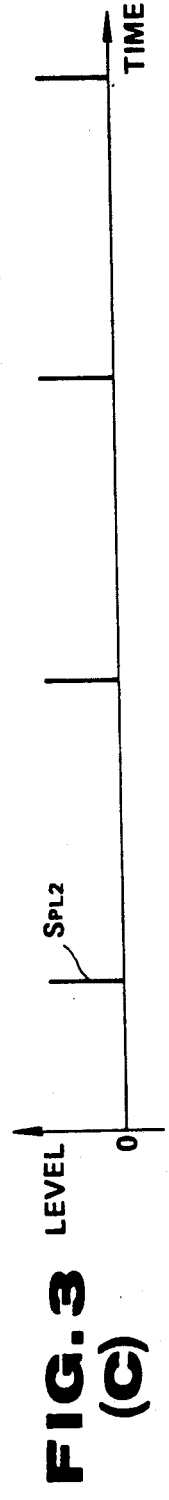
Figure 3:
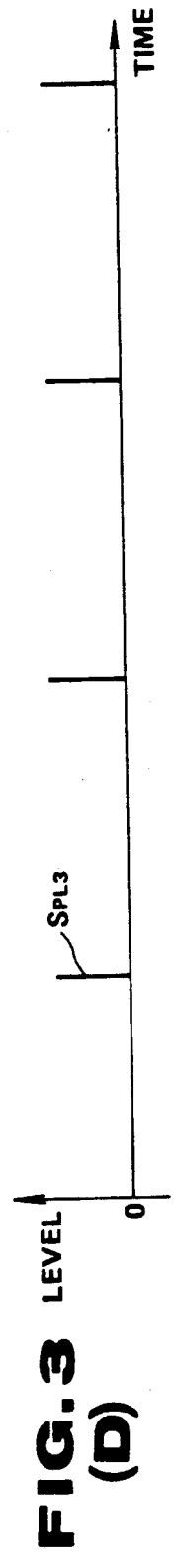
Figure 3:
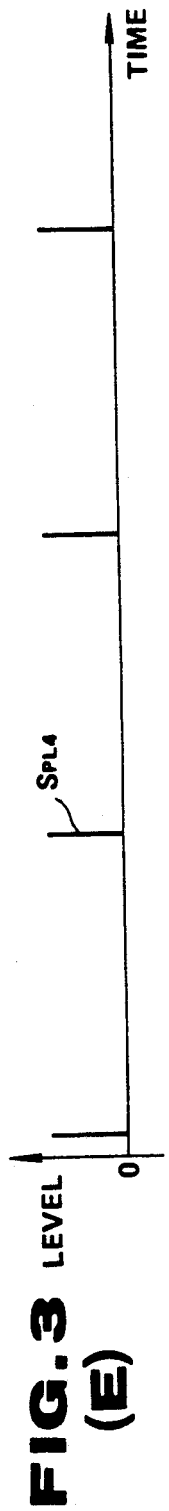

As shown in FIG. 2, the laser diode controlling section 30 includes a time sharing circuit (multiplexer) for equally dividing a basic pulse signal $S_{PL0}$ (refer to FIG. 3 (A)) having a predetermined pulse repetition rate and derived by a pulse generator 31 into four pulse segments. Then, the time sharing circuit 32 generates first, second, third, and fourth drive pulse signals $S_{PL1}$, $S_{PL2}$, $S_{PL3}$, and $S_{PL4}$ (refer to FIGS. 3 (B) to 3 (E)) each of which rise whenever the basic pulse signal $S_{PL0}$ rises four times and each of which are mutually out of phase by one repetition rate of the basic pulse signal $S_{PL0}$.

The first, second, third, and fourth drive pulse pulse signals $S_{PL1}$, $S_{PL2}$, $S_{PL3}$, and $S_{PL4}$ are used to drive the corresponding laser diode driving circuits 33A, 33B, 33C, and 33D.

In this way, the basic pulse signal $S_{PL0}$ is divided into four signals constituting the first, second, third, and fourth drive pulse signals $S_{PL1}$, $S_{PL2}$, $S_{PL3}$, and $S_{PL4}$ so as to drive the respective laser diodes 3A, 3B, 3C, and 3D in the time sharing mode. Thus, reproducing light beams $LA_{11}$, $LB_{11}$, $LC_{11}$, and $LD_{11}$ which emit in sequence impinge on first, second, third, and fourth record tracks $TR_A$, $TR_B$, $TR_C$, and $TR_D$ on the optical recording medium 1.

The reproducing photo detector 21 is provided with a single photo detector element 21A selected in a form so as to enclose four photo detector elements in place of the four photo detector elements used in the previously proposed optically recorded information processing apparatus. The reproduced signal SPB thus generated is input into an analog-to-digital converter 23 via a reproducing amplifier 22 shown in FIG. 4.

The analog-to-digital converter 23 receives the basic pulse signal $S_{PL0}$ derived from the pulse generator 31 shown in FIG. 2 so that the reproduced signal SPB provided from the reproducing amplifier 22 is converted into a digital data at a timing of the basic pulse signal $S_{PL0}$ and is supplied to the subsequent digital demodulator 24 as a reproduced digital data $D_{PB}$.

Figure 4:
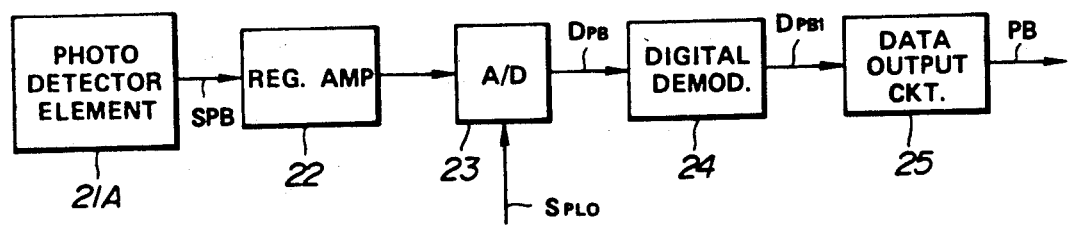
FIG. 4 is a circuit block diagram of a digital data reproducing processing section.

The digital demodulator 24 uses a demodulation method corresponding to a demodulation method of the recorded digital data recorded on the optical record medium 1 to demodulate the input reproduced digital data $D_{PB}$ into a reproduced data $D_{PB1}$. The reproduced data $D_{PB1}$ carries out a distributing processing at timings of respective record tracks $TR_A$, $TR_B$, $TR_C$, and $TR_D$ via a data output circuit 25 so that an output data PB representing the data recorded on the tracks $TR_A$, $TR_B$, $TR_C$, and $TR_D$ on the optical recording medium 1 is supplied as shown in FIG. 4.

It is noted that in the preferred embodiment, frequencies of the four drive pulse signals $S_{PL1}$, $S_{PL2}$, $S_{PL3}$, and $S_{PL4}$ for the respective laser diodes 3A, 3B, 3C, and 3D are selected to those four times a maximum pulse repetition rate of the recorded data on the record tracks $TR_A$, $TR_B$, $TR_C$, and $TR_D$ on the optical record medium 1. Therefore, as appreciated from a sampling theorem, the recorded data on the respective record tracks $TR_A$, $TR_B$, $TR_C$, and $TR_D$ can accurately be reproduced by converting the analog signal, i.e., the reproduced signal SPB to a digital signal at a timing of the basic pulse signal $S_{PL0}$ having a frequency four times each drive pulse signal $S_{PL1}$, $S_{PL2}$, $S_{PL3}$, and $S_{PL4}$, the analog signal SPB including pulse-formed reproduced lights $LA_{R0}$, $LB_{R0}$, $LC_{R0}$, and $LD_{R0}$ derived from the laser diodes 3A, 3B, 3C, and 3D emitting laser light beams in the time sharing mode.

In the above-described construction, suppose that, for example, when a continous light beams is impinged on first, second, third, and fourth record tracks $TR_A$, $TR_B$, $TR_C$, and $TR_D$ on the optical record medium 1, recorded data DA, DB, DC, and DD are recorded which produce changes in quantities of reflected lights as denoted by dotted lines in FIGS. 5 (A), 5 (B), 5 (C), and 5 (D), reproduced lights $LA_{R0}$, $LB_{R0}$, $LC_{R0}$, and $LD_{R0}$ derived by impinging the first, second, third, and fourth laser diodes 3A, 3B, 3C, and 3D sequentially n the time sharing mode thereon include first, second, third and fourth reproduced pulse signals whose levels change according to the changes in the quantities of reflected lights as shown in FIGS. 5 (A) to 5 (D).

The reproduced signal denoted by SPB and derived from the reproducing photo detector 21 comprises an analog signal (refer to FIG. 5 (E)) obtained by adding their reproduced pulse signals. The analog-to-digital conversion is carried out at a timing on the rising edge of the basic pulse signal $S_{PL10}$. Then, the converted digital signal is demodulated so as to distribute according to the record tracks $TR_A$, $TR_B$, $TR_C$, and $TR_D$, thus achieving an accurate reproduction of the recorded data DA, DB, DC, and DD on the optical recording medium 1.

The four laser diodes 3A, 3B, 3C, and 3D are used to form reproduced light beams $LA_{11}$, $LB_{11}$, $LC_{11}$, and $LD_{11}$ on the four record tracks $TR_A$, $TR_B$, $TR_C$, and $TR_D$ on the optical record medium 1. Then, in the optically recorded information processing apparatus 20, the reproduced lights $LA_{R0}$, $LB_{R0}$, $LC_{R0}$, and $LD_{R0}$ which are reflected lights of the reproduced light beams $LA_{11}$, $LB_{11}$, $LC_{11}$, and $LD_{11}$ are used to reproduce the recorded information on the optical record medium 1, the four laser diodes 3A, 3B, 3C, and 3D are emitted and driven sequentially in the time sharing mode, respectively, so as to form the reproduced light beams $LA_{11}$, $LB_{11}$, $LC_{11}$, and $LD_{11}$. The reproduced lights $LA_{R0}$, $LB_{R0}$, $LC_{R0}$, and $LD_{R0}$ are received on the single photo detector element 21A to produce the reproduced signal SPB. Consequently, a crosstalk mixed in the reproduced signal SPB can be eliminated with the simple construction. In addition, the optically recorded information reproducing apparatus 20 which can reproduce a recorded information on the optical record medium 1 with a high fidelity can be easily be achieved.

Furthermore, since, in the preferred embodiment, the single photo detector element can be used to produce the reproduced signal SPB, the single reproducing amplifier may be installed according to the number of the photo detector. Therefore, the entire circuit construction can be simplified.

Although, in the preferred embodiment, the reproduced signal SPB is digitally processed, the analog signal processing may be adopted.

Figure 6:
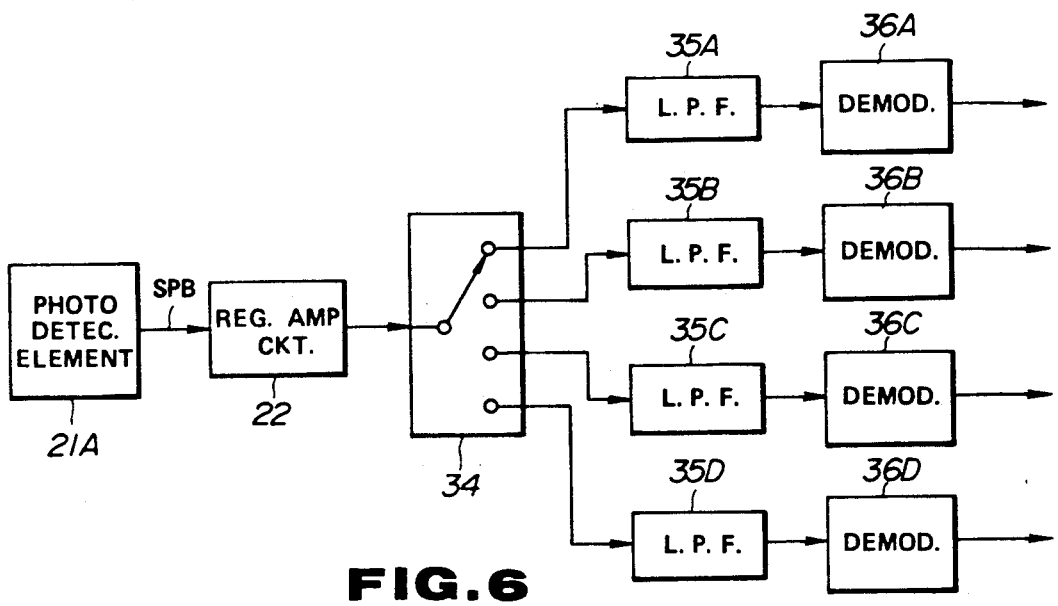
FIG. 6 is a circuit block diagram of an analog data reproducing processing section.
Figure 7:
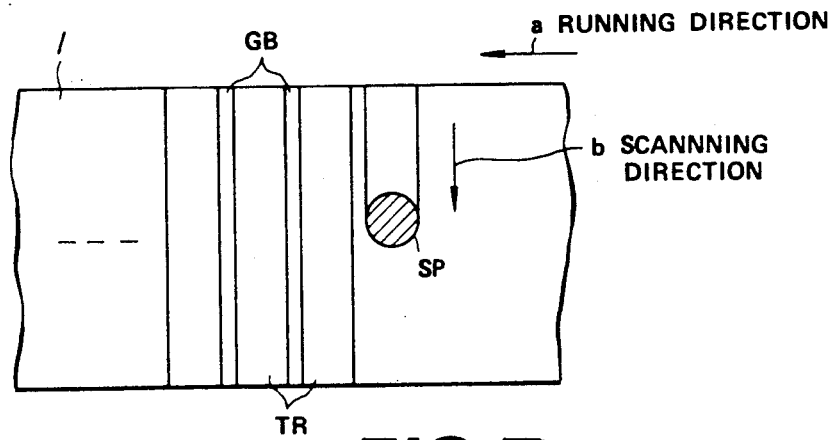
FIGS. 7 and 8 are diagramatic views for explaining methods for optical recording.
Figure 8:
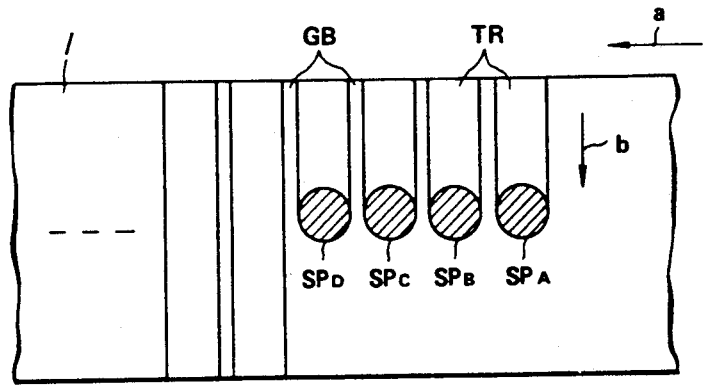

In this case, as shown in FIG. 6, the reproduced signal SPB is passed through the reproducing amplifier 22 and supplied to an analog demultiplexor 34 constituted by an analog switch to distribute the analog reproduced signal SPB into four respective low pass filter (LPF) 35 A to 35D at timings correspondiong to their record tracks $TR_A$, $TR_B$, $Tr_C$, and $TR_D$. Then, the signal SPB is demodulated by means of respective demodulators 36A to 36D via the corresponding low pass filters 35A to 35D. Therefore, the optically recorded data on the optical record medium can be reproduced. In this case, the same effects as the preferred embodiment can be achieved. In this case, the demultiplexor 34 may be switched at a timing on each rising edge of the basic pulse signal $S_{PL0}$ derived from the pulse generator 31.

In addition, although, in the preferred embodiment, the reflected lights of the reproduced light beams formed on the optical recording medium are used to derive the recorded data on the optical record medium, transparent lights of the reproduced light beams may be used to obtain the optically recorded data on the optical record medium in place of the reflected lights. In this case, the beam splitter and ¼ wave plate, and other elements can be omitted in the optical system. Therefore, the optically recorded information reproducing apparatus with simpler construction can be achieved.

Futheremore, although, in the preferred embodiment, the frequency of the drive pulse signal for each laser diode is set to that four times the maximum repetition rate of the recorded information on the optical record medium, it can be set to more than twice on the basis of the sampling theorem. Thus, the same effects as the above-described preferred embodiment can be achieved.

The present invention can also applied to a case where a plurality of laser diodes other than four may be used to reproduce the corresponding number of record tracks at the same time.

Finally, although, in the preferred embodiment, the tape-formed optical record medium is used, the present invention can also be applied to the optically recorded information reproducing apparatus in which a card-formed or disc-formed record medium is used.

As described hereinabove, in the optically recorded information reproducing apparatus according to the present invention in which the plurality of record tracks on the optical record medium can simultaneously be reproduced, the plurality of light sources which irradiate light beams on the plurality of record tracks are illuminated in the time sharing mode, the reproduced lights derived from the record tracks are received using the single light receiving means, and the reproduced signal is processed in the time sharing reproducing mode, whereby the crosstalk of the reproduced lights derived from the plurality of record tracks can effectively be prevented and thus the plurality of record tracks can simultaneously and accurately be reproduced.

It will be appreciated by those skilled in the art that the foregoing description is made in terms of the preferred embodiment and the various changes and modifications may be made without departing from the scope of the present invention which is to be defined by the appended claims.

What is claimed is:

1. An apparatus for reproducing optically recorded information on an optical record medium, comprising:
    (a) first means, including a plurality of light sources, for operatively irradiating a plurality of record tracks on the record medium so as to form reproduced light beams;
    (b) second means for receiving the reproduced light beams from the respective record tracks and transmitting reproduced signals upon the receipt of the light beams;
    (c) third means for controlling the light sources so as to form the light beams according to a predetermined sequence in a time sharing mode, said third means comprising a multiplexer for sequentially distributing pulse signals having a predetermined repetition rate to said light sources, and
    (d) fourth means for processing the reproduced signals derived from the second means in the time sharing mode.

2. An apparatus as set forth in claim 1, wherein the second means includes a single photo detector element.

3. An apparatus for reproducing optically recorded information on an optical record medium, comprising:
    (a) first means, including a plurality of light sources, for operatively irradiating a plurality of record tracks on the record medium so as to form reproduced light beams;
    (b) second means for receiving the reproduced light beams from the respective record tracks and transmitting reproduced signals upon the receipt of the light beams;
    (c) third means for controlling the light sources so as to irradiate the light beams in a time sharing mode;
    (d) fourth means for processing the reproduced signals derived from the second means in the time sharing mode;
    wherein the second means includes a single photo detector element and
    wherein the third means includes: (a) a pulse signal generator which generates and outputs a pulse signal having a predetermined repetition rate; and (b) a multiplexer for sequentially distributing the pulse signal to each light source whenever the pulse signal is received.

4. An apparatus as set forth in claim 3, wherein each light source comprises a laser diode.

5. An apparatus as set forth in claim 3, wherein the fourth means includes: (a) a reproducing amplifier for amplifying the output signal derived from the photo detector element; (b) an analog-to-digital converter for converting the output signal from the amplifier into a corresponding digital signal at each occurrence of the pulse signal from the pulse generator; (c) a digital demodulator for demodulating the digital signal from the analog-to-digital converter; and (d) a data output circuit for outputting a data indicative of the demodulated signal from the digital demodulator according to the record tracks.

6. An apparatus as set forth in claim 3, wherein the fourth means includes: (a) a reproducing amplifier for amplifying the output signal derived from the photo detector element, (b) a demultiplexor for distributing the amplified signal from the amplifier into a plurality of low-pass filter according to a timing corresponding to each record track scanned by the first means; and (c) a plurality of demodulators each for demodulating the distributed signal passed through a corresponding low-pass filter.

7. An apparatus as set forth in claim 6, wherein the demodulator switches so as to distribute the amplified signal whenever the pulse signal derived from the pulse generator rises.

8. An apparatus as set forth in claim 3, wherein the repetition rate of the distributed pulse signal is set at at least twice a maximum repetition rate of the optically recorded information.

9. An apparatus as set forth in claim 8, wherein the repetition rate of the distributed pulse signal is set at four times the maximum repetition rate of the optically recorded information.

10. An apparatus as set forth in claim 8, wherein the number of light sources is four.

11. An apparatus as set forth in claim 3, wherein the first means includes a plurality of collimators optically associated with the light sources, a deflector element, polarizing beam splitter, ¼ wave plate, and an object lens located adjacent to the optical record track.

12. An apparatus as set forth in claim 11, wherein a scanning direction of the irradiated beams is orthogonal to a running direction of the record medium.

13. An apparatus as set forth in claim 12, wherein the record medium is a tape.

* * * * *